B. F. WEATHERN.
HARVESTER CUTTER.
APPLICATION FILED MAR. 30, 1910.

969,817.

Patented Sept. 13, 1910.

Witnesses:
H. B. Davis
D. S. Peterson

Inventor:
Benjamin F. Weathern
by Noyes & Harriman
attys.

UNITED STATES PATENT OFFICE.

BENJAMIN F. WEATHERN, OF WEST FARMINGTON, MAINE.

HARVESTER-CUTTER.

969,817.  Specification of Letters Patent.  Patented Sept. 13, 1910.

Application filed March 30, 1910. Serial No. 552,293.

*To all whom it may concern:*

Be it known that I, BENJAMIN F. WEATHERN, of West Farmington, county of Franklin, State of Maine, have invented an Improvement in Harvester-Cutters, of which the following is a specification.

This invention relates to harvester-cutters of the type employing a plurality of rotary cutters arranged on the finger-bar, the alternate cutters revolving in opposite directions; and has for its object to provide stationary resilient cutting-blades with which the revolving cutters coöperate to produce a shear cut; also, to arrange the stationary resilient cutting-blades on alternate fingers, and to form them each with two cutting-edges arranged at opposite sides, adapting each blade to coöperate with two revolving cutters which revolve in opposite directions; also, to arrange both the revolving cutters and stationary resilient cutting-blades on top of the finger-bar, and the operating means for the revolving cutters more or less removed therefrom, so that said cutters and blades are entirely exposed, to permit the grass to pass over them without obstruction and thereby prevent clogging.

Figure 1:
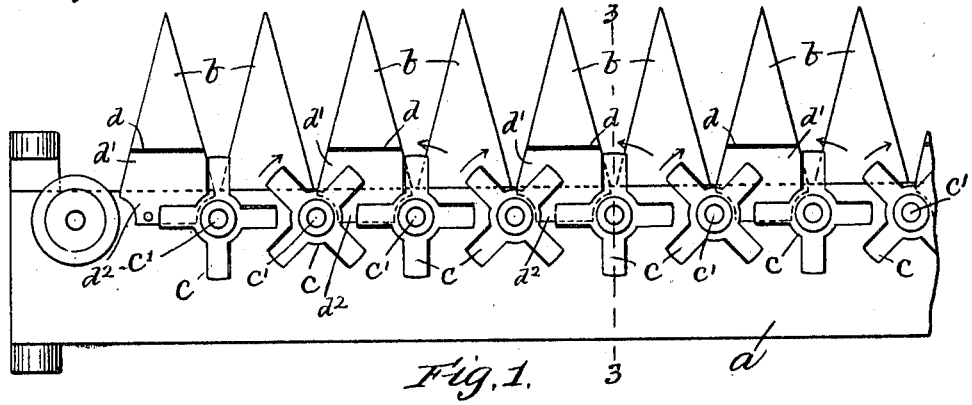
Figure 3:
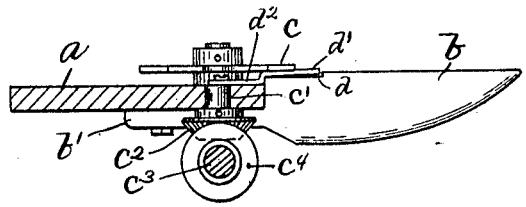
Figure 4:
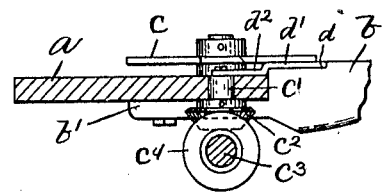
Figure 2:
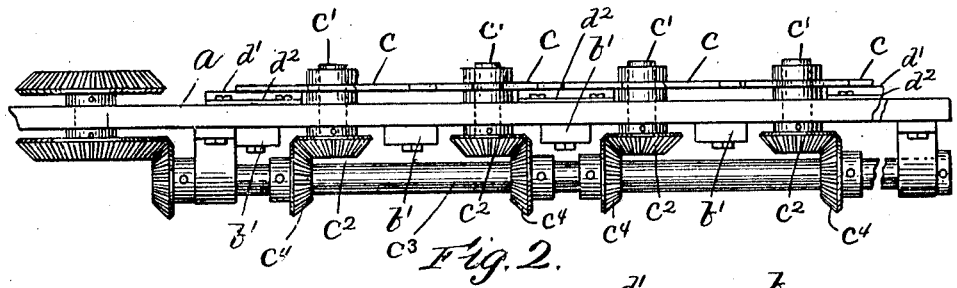
Figure 5:
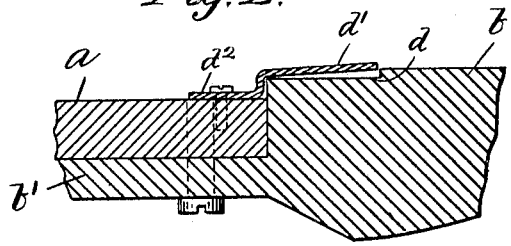

Figure 1 is a plan view of a portion of a harvester-cutter embodying this invention, Fig. 2 is an enlarged rear side view of the harvester-cutter shown in Fig. 1, Fig. 3 is a transverse section of the harvester-cutter shown in Fig. 1, taken on the dotted line 3—3, Fig. 4 is another transverse section of the harvester-cutter shown in Fig. 1, taken on the dotted line 3—3, Fig. 5 is an enlarged sectional detail of the stationary resilient cutting-blade.

$a$ represents the finger-bar of any usual or suitable construction, and $b$ the fingers extended therefrom, having shanks $b'$ extended under and attached to the bar.

$c$ represents the revolving cutters, which are arranged on top of the bar. Said cutters are each formed with a plurality of radially-extended cutting-blades, four being here shown. Said cutters are arranged on top of the bar and quite close together, the radial blades at the opposite sides of alternate cutters entering the recesses between the radial blades of the adjacent cutters as the cutters are revolved, thereby permitting the employment of a large number of cutters. Said cutters are secured by any suitable means to stub-shafts $c'$ extended through the bar, or they may be otherwise supported, and means are provided for revolving said stub-shafts. As here shown, beveled gears $c^2$ are secured to the lower ends of the stub-shafts, and a driving-shaft $c^3$ is extended lengthwise the finger-bar, having secured to it beveled gears $c^4$, which respectively engage the beveled gears $c^2$. Alternate beveled gears $c^4$ are oppositely disposed with respect to the gears adjacent thereto, to engage the gears $c^2$ of alternate cutters at opposite sides, so that, as the driving-shaft is revolved, said alternate cutters will be revolved in directions opposite to the cutters adjacent thereto, as indicated by the arrows, Fig. 1. Any other suitable driving-means may be employed for revolving the cutters, which is arranged and adapted to revolve said cutters in opposite directions, and is disposed remotely with respect to the cutters, whereby said cutters are entirely exposed on top of the bar. If said cutters were housed, it is obvious that they would become clogged by the grass working in and around them; but when entirely exposed, the grass is free to pass over them so that they cannot become clogged.

The several cutters are arranged opposite the converging spaces between the fingers, as shown in Fig. 1, and stationary cutting-blades are provided, with which the revolving cutters coöperate. The stationary cutting-blades are made of thin plates and are mounted so as to yield as the revolving cutters coöperate therewith, to produce a shear cut and then spring back, and, as the cutters revolve in opposite directions, the cutting-blades are provided with cutting edges at both sides, whereby a single cutting-blade will coöperate with two revolving cutters, thus reducing by one half the number of cutting-blades required. Said stationary resilient cutting-blades are arranged on and supported by alternate fingers $b$, and, referring to Fig. 5, the fingers bearing the stationary blades are recessed at their tops, adjacent the finger-bar, as at $d$, said recesses extending transversely from side to side of the fingers, and the resilient blades $d'$ are placed in said recesses, having attaching portions $d^2$ extending over the top of the finger-bar, whereby said blades are attached to the finger-bar and the forwardly-extended portions thereof, which are contained in the recesses in the fingers, are free or unattached. Said blades, or at least their free or unattached portions, which extend over the fingers, and occupy positions in the recesses thereof, are formed at both sides with a cutting-edge. Said cutting-blades are held with their forwardly extended portions lifted slightly above the bottoms of the recesses, and being made quite thin are permitted to be depressed by the revolving cutters passing over them and then spring back, hence said cutting blades are resilient. In the arrangement shown, as the revolving cutters are arranged on top of the finger-bar, and extended over the tops of the stationary resilient cutting-blades, which are arranged on top of the fingers, all the cutting members are exposed and cannot become clogged.

I claim:

1. A harvester-cutter consisting of a finger-bar having a plurality of like fingers attached thereto, a plurality of revolving-cutters arranged on top of said bar and entirely exposed, stationary resilient cutting-blades with which said revolving cutters coöperate, to produce a shear cut, and operating means for the revolving-cutters arranged beneath the bar substantially as described.

2. A harvester-cutter consisting of a finger-bar having a plurality of like fingers attached thereto, a plurality of revolving cutters supported by the bar, means for revolving alternate cutters in opposite directions, stationary resilient blades arranged on the tops of alternate fingers, having their opposite sides formed as cutting-edges, with which said revolving cutters coöperate, substantially as described.

3. A harvester-cutter consisting of a finger-bar having a plurality of like fingers attached thereto, a plurality of cutters supported by said bar, means for revolving alternate cutters in opposite directions, stationary resilient blades attached to the finger-bar and extended over upon and contained in recesses formed in the tops of alternate fingers, and having cutting-edges at opposite sides with which said revolving cutters coöperate, substantially as described.

4. A harvester cutter consisting of a finger-bar bearing a plurality of like fingers, a plurality of revolving cutters borne by said bar, having radial cutting-blades, and stationary resilient cutting-blades mounted on said bar with which said revolving cutters coöperate to produce a shear cut, substantially as described.

In testimony whereof, I have signed my name to this specification, in the presence of two subscribing witnesses.

BENJAMIN F. WEATHERN.

Witnesses:
  Jos. C. Holman,
  Geo. M. Currier.